(12) United States Patent
Fan et al.

(10) Patent No.: US 12,366,014 B2
(45) Date of Patent: Jul. 22, 2025

(54) METHOD FOR PREPARING BLACK FIBERS

(71) Applicant: JIANGSU HENGLI CHEMICAL FIBRE CO., LTD., Wujiang (CN)

(72) Inventors: Hongwei Fan, Wujiang (CN); Jiangen Shen, Wujiang (CN); Lili Wang, Wujiang (CN); Fangming Tang, Wujiang (CN); Zhengping Yuan, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 0 days.

(21) Appl. No.: 18/723,469

(22) PCT Filed: Nov. 2, 2022

(86) PCT No.: PCT/CN2022/129160
§ 371 (c)(1),
(2) Date: Jun. 24, 2024

(87) PCT Pub. No.: WO2023/116211
PCT Pub. Date: Jun. 29, 2023

(65) Prior Publication Data
US 2025/0066958 A1    Feb. 27, 2025

(30) Foreign Application Priority Data

Dec. 24, 2021 (CN) .......................... 202111596505.5

(51) Int. Cl.
*D02G 3/04* (2006.01)
*D01F 1/04* (2006.01)
(Continued)

(52) U.S. Cl.
CPC .............. *D02G 3/045* (2013.01); *D01F 1/04* (2013.01); *D02G 1/022* (2013.01); *D02G 1/028* (2013.01);
(Continued)

(58) Field of Classification Search
CPC .......... D02G 3/045; D02G 3/44; D02G 1/022; D02G 1/028; D02G 1/0286; D01F 1/04; D10B 2331/04
See application file for complete search history.

(56) References Cited

FOREIGN PATENT DOCUMENTS

| CN | 1598103 A | 3/2005 |
|---|---|---|
| CN | 1940156 A | 4/2007 |

(Continued)

OTHER PUBLICATIONS

Rui Li, China's chemical fiber industry technology development process, 2004, pp. 753-754, 1st edition, China Textile Publishing House.

(Continued)

*Primary Examiner* — Shaun R Hurley
(74) *Attorney, Agent, or Firm* — Bayramoglu Law Offices LLC

(57) ABSTRACT

A method for preparing black cotton-like fibers is provided, using a DTY texturing process, wherein POY and FDY fibers containing carbon black are sequentially passed through a first yarn guide, a yarn guide roller, a tensioner, a first yarn feeding roller, pre-entangling, a second yarn feeding roller, a first deformation hot box, a cooling plate, a false twister, a third yarn feeding roller, a middle entangling device, a setting hot box, a setting yarn feeding roller, oiling, and winding to obtain a black cotton-like fiber; the first yarn guide is a yarn guide wheel; a tow contacts a groove bottom of the first yarn guide in the process of movement, driving the first yarn guide to rotate; and the tensioner is a magnetic tensioner.

7 Claims, 1 Drawing Sheet

(51) Int. Cl.
  *D02G 1/02*  (2006.01)
  *D02G 3/44*  (2006.01)
(52) U.S. Cl.
  CPC ............ *D02G 1/0286* (2013.01); *D02G 3/44* (2013.01); *D10B 2331/04* (2013.01)

(56) References Cited

FOREIGN PATENT DOCUMENTS

| CN | 102277667 | A |   | 12/2011 |
|----|-----------|---|---|---------|
| CN | 102943329 | A |   | 2/2013  |
| CN | 103184596 | A |   | 7/2013  |
| CN | 103233305 | A |   | 8/2013  |
| CN | 107557932 | A |   | 1/2018  |
| CN | 108977956 | A | * | 12/2018 |
| CN | 109023616 | A |   | 12/2018 |
| CN | 210657286 | U |   | 6/2020  |
| CN | 112708976 | A |   | 4/2021  |
| CN | 112831875 | A |   | 5/2021  |
| CN | 114232159 | A |   | 3/2022  |
| EP | 1788127   | A1 | * | 5/2007 | ............ D01F 8/12 |
| JP | H06128830 | A |   | 5/1994  |
| JP | 2017172080 | A |   | 9/2017 |
| JP | 2019026991 | A |   | 2/2019 |
| JP | 2019116691 | A | * | 7/2019 |
| JP | 2020105682 | A | * | 7/2020 |

OTHER PUBLICATIONS

GB/T 14344-2008, Testing method for tensile of man-made filament yarns, General Administration of Quality Supervision, Inspection and Quarantine of the People's Republic of China & Standardization Administration of the People's Republic of China, 2005, pp. 1-10.

FZ/T 50001-2005, Testing method for interlacing degree of synthetic filament yarns, National Development and Reform Commission, 2005, pp. 1-10.

Xiaoyan Liu, et al., Coeficient Test and Analysis of High-Performance Fibers, Sichuan Textile Technology, 2002, pp. 15-17.

* cited by examiner

METHOD FOR PREPARING BLACK FIBERS

CROSS-REFERENCE TO THE RELATED APPLICATIONS

This application is the national phase entry of International Application No. PCT/CN2022/129160, filed on Nov. 2, 2022, which is based upon and claims priority to Chinese Patent Application No. 202111596505.5, filed on Dec. 24, 2021, the entire contents of which are incorporated herein by reference.

TECHNICAL FIELD

The present invention belongs to the technical field of polyester fibers, and more particularly, relates to a method for preparing black cotton-like fibers.

BACKGROUND

Polyester is polyethylene terephthalate (PET) produced by polycondensation of terephthalic acid (PTA) and ethylene glycol (EG). Polyester is the largest category of synthetic fibers, and its output ranks first among all chemical fibers. The main varieties on the market currently include pre-oriented yarn (POY), fully drawn yarn (FDY), drawn textured yarn (DTY) and so on.

Pre-oriented yarn, also known as partially oriented yarn, is a primary yarn (also known as winding yarn) obtained by high-speed spinning (spinning speed 3000-3600 m/min). Compared with the general drawn yarn, it has low orientation and low crystallinity; compared with the undrawn yarn (UDY) obtained by conventional spinning, it has high orientation. In the early 1970s, due to the industrial production of high-speed winding machines, high-speed spinning technology has developed rapidly and gradually achieved industrialization. The primary yarn obtained by the high-speed spinning process has a certain degree of orientation, and can be directly stretched and deformed to produce textured yarn, thus shortening the process.

FDY is a drawn yarn with a fully oriented structure produced by a one-step continuous process that introduces stretching into the high-speed spinning of POY, and integrates spinning, stretching and winding into one single step. Compared with POY, FDY and POY both have a common high degree of orientation, but the crystallinity of FDY is higher than that of POY Although POY and FDY have a certain degree of orientation, their properties are still unstable compared with finished yarns, and they do not have wearability, so it is necessary to be post-processed. More than 90% of the post-processing is through the stretching and deformation process to produce DTY (commonly known as low-elastic yarn). Polyester low-elastic yarn is a new type of yarn with high curling and fluffy properties obtained through deformation and heat-setting by using polyester filaments as raw materials and using the thermoplasticity of the fiber. DTY filament products are soft and fluffy. Fabrics made of DTY have good fluffy and warm properties, generally be used in clothing, tents, bags, etc.

Currently, carbon black is usually used as a color masterbatch to color polyester filaments, but inorganic additives such as carbon black lead to roughness of the raw material tow, which wears out the first yarn guide with grooves in a short time, reducing the service life of the yarn guide. In addition, the wear between the tow and the yarn guide will also have a negative impact on the yarn performance.

Since the first yarn guide is worn out with grooves, the surface of grooves is relatively rough, which will produce a large resistance force on the tow, so that the tow will have a high tension between the first yarn guide and the first feeding roller. The tension will be transmitted to the tow of the first feeding roller and the second feeding roller, resulting in excessive tension of the tow, so that the interlacing jets cannot tighten the network of the tow, causing network derailment and product quality problems, and making it impossible to be produced. Therefore, it is necessary to optimize the production process to solve the problems of high wear of the yarn guide and high tension of the tow, so as to make pre-entangling more stable.

SUMMARY

The purpose of the invention is to solve the above problems existing in the prior art, and to provide a method for preparing black cotton-like fibers.

To this end, the technical schemes of the invention are as follows:

A method for preparing black cotton-like fibers, using a DTY texturing process, wherein a polyester POY fiber and a polyester FDY fiber are sequentially passed through a first yarn guide, a yarn guide roller, a tensioner, a first yarn feeding roller, pre-entangling, a second yarn feeding roller, a first deformation hot box, a cooling plate, a false twister, a third yarn feeding roller, a middle entangling device, a setting hot box, a setting yarn feeding roller, oiling, and winding to obtain a black cotton-like fiber;

wherein the polyester POY fibers and the polyester FDY fibers both contain carbon black; wherein the first yarn guide is a yarn guide wheel;

wherein a tow contacts a groove bottom of the first yarn guide in the process of movement, driving the first yarn guide to rotate;

wherein the tensioner is a magnetic tensioner, which is a tension control device that generates damping by converting torque changes through magnetic field and has no mechanical friction, the magnetic tensioner is small in size and easy to install; wherein the tow contacts a groove bottom of a yarn guide wheel carried by the tensioner in the process of movement; wherein a setting tension value of the tensioner is 7-10 cN (adjusted by the sensor in the tensioner, and the direction of the tension points to the two ends of the tow), after replacing the first yarn guide from a yarn guide roller to a yarn guide wheel, although the tension of the tow is greatly reduced, it will cause the tension of the tow to be difficult to control and be unstable, leading to serious jittering of the tow; after applying a tension of 7-10 cN, the jittering of the tow can be greatly reduced;

wherein a linear velocity ratio of the first yarn feeding roller to the second yarn feeding roller is 1.03-1.04, forming a certain overfeeding ratio, which facilitates the formation of pre-entangling.

The following preferred technology program is presented to give a detailed description for this invention:

The said method for preparing black cotton-like fibers, wherein a rim width of the yarn guide wheel of the first yarn guide is 20-25 mm, an outer diameter of an outer wheel of the yarn guide wheel is 9.4-10.7 mm, and an inner diameter of the groove bottom is 6-7.4 mm.

The said method for preparing black cotton-like fibers, wherein the material of the first yarn guide is ceramic, a surface hardness of its groove bottom is 1500-2000 HV (Vickers hardness), and a friction coefficient between the groove bottom and the tow is 0.2-0.22 (the friction coefficient refers to the test method in the article "*Friction Coefficient Test And Analysis of High-Performance Fibers*").

The said method for preparing black cotton-like fibers, wherein a tension value of the tow during pre-entangling is 2.5-5.0 cN, and the tension of the tow during pre-entangling is still within this range after one year of continuous DTY texturing.

The said method for preparing black cotton-like fibers, wherein contents of carbon black in the polyester POY fiber and the polyester FDY fiber are both 1.2-1.5 wt %.

The said method for preparing black cotton-like fibers, wherein an average particle size of carbon black is 0.3-0.4 µm.

The said method for preparing black cotton-like fibers, wherein specifications of the polyester POY fiber and the polyester FDY fiber are both 120 dtex/96f, and a linear density of the black cotton-like fiber is 232 dtex.

The said method for preparing black cotton-like fibers, wherein main process parameters are: a pre-entangling jet air pressure of 2.5-2.9 bar, a pre-entangling jet aperture of 1.5-1.7 mm, a first deformation hot box temperature of 175-190° C., a setting hot box temperature of 150-160° C., a linear velocity ratio (stretching ratio) of the third yarn feeding roller to the second yarn feeding roller of 1.1-1.14, a setting overfeeding rate of 4.0-5.0%, a winding speed of 500-600 m/min, and a winding overfeeding rate of 2.0-3.0%.

The said method for preparing black cotton-like fibers, wherein the black cotton-like fiber has a breaking strength of 2.1-2.3 cN/dtex (Test standard: GB/T 14344), an interlacing degree of 90-100/m (Test standard: FZ/T 50001-2005), and a coefficient of variation (CV) value of breaking strength ≤6.00%;
  wherein change rates of the breaking strength, the interlacing degree and the CV value of breaking strength of the black cotton-like fibers produced by continuous production for 60 days are not higher than 10%; that is, compared with the production of the black cotton-like fiber on the first day, after continuous production for two months, the breaking strength and the interlacing degree of the obtained black cotton-like fiber decrease by no more than 10%, and the CV value of breaking strength increases by no more than 10%.

The principle of the present invention is as follows:

The coloring of polyester filaments with carbon black as the color masterbatch will make the surface of the tow rough, since the yarn guide cannot rotate around the axis in the existing texturing process, there is a sliding friction between the tow and the yarn guide, which leads to the wear of the first yarn guide within 3-5 days when the polyester filament is using DTY texturing process; since the first yarn guide is worn out for a short time and a groove is formed, the resistance tension generated when the tow passes through the groove is large, resulting in the tension of the tow becoming larger when passing through the first yarn guide, which can be increased to 20-25 cN; since the grip of the first yarn feeding roller is that the two outer circles contact and press the grip, the grip is insufficient and cannot reach 100%, and there is slippage, therefore the 20-25 cN tension at the first yarn guide will increase the tow tension to 6-8 cN during pre-entangling (if the grip is sufficient, the tow tension will only be affected by the overfeed ratio, but once the grip is insufficient, the tow tension before the first feeding roller will affect the tow tension after the first feeding roller. If the tow tension before the first feeding roller is too large, the tow tension after the first feeding roller will increase); the tension of the tow is too large so that the interlacing jet of pre-entangling can't make the network of the tow firm, resulting in the network derailment. Therefore, in the subsequent weaving process of the tow, the network is small, and due to the physical properties of the two-component composite filaments are not the same, the dual-filament embrace is poor, resulting in many broken ends during the weaving process, and there will be knots and lumps on the fabric, leading to an uneven cloth surface, which seriously affects the performance of the product.

By replacing the original first yarn guide with a yarn guide wheel, the invention is able to change the friction between the tow and the yarn guide from sliding friction to rolling friction, which can not only reduce the wear of the yarn guide, but also greatly reduce the tension of the tow when passing through the first yarn guide.

Since the first yarn guide is replaced by a yarn guide wheel, the tension of the tow is greatly reduced; but after the replacement of the yarn guide wheel, the tension of the tow is difficult to control and is unstable, it is not possible to control the tension within a stable range, and the yarn guide wheel will cause the tension of the tow being too small, leading to serious jittering of the tow and producing floating filaments, making production impossible. Therefore, the invention applies a certain tension to the tow through the magnetic tensioner and the yarn guide roller, the magnetic tensioner and the yarn guide roller are placed between the first yarn guide and the first yarn feeding roller, the magnetic tensioner is closer to the first yarn feeding roller, and the angle of the tow before and after contacting with the bottom of the groove of the yarn guide roller carried by the magnetic tensioner is within a certain range; the tow will generate pressure on the yarn guide wheel during movement, so that the angle tends to become larger, so the damping generated by the magnetic tensioner will form a reaction force with the pressure generated by the tow to maintain the stability of the angle size; the reaction force forms the tension of the tow. The yarn guide roller can stabilize the shaking phenomenon caused by the reduction of tension, which is very helpful in controlling the tension by means of a tensioner.

By setting the tension of the magnetic tensioner in the range of 7-10 cN, the invention can greatly reduce the jittering of the tow and keep the tow stable; too much or too little tension is not conducive to the stability of pre-entangling.

The invention also sets the linear velocity ratio (overfeed ratio) of the first yarn feeding roller to the second yarn feeding roller to 1.03-1.04 to form overfeeding, so that the tension of the tow during pre-entangling is 2.5-5.0 cN (although the grip is insufficient in the first yarn feeding roller, which will cause the tension of the tow before the first yarn feeding roller to affect the tension of the tow after the first yarn feeding roller; because the yarn guide is replaced by a yarn guide wheel, and the tow tension is controlled by the magnetic tensioner, it greatly reduces the tension of the tow before the first yarn feeding roller, which also greatly reduces the process difficulty of controlling the tension by controlling the overfeeding ratio, and it is completely possible to realize that the tension of the tow during pre-entangling is kept within the range of 2.5-5.0 cN), which enables stable netting without producing loose nets or floating yarns.

Benefits:
  (1) The method for preparing black cotton-like fibers of the invention, can improve the interlacing degree of the tow, and do not loosen, which makes the surface of the carbon black-containing polyester low-elastic yarn fabric obtained later smooth and not easy to break;

(2) The method for preparing black cotton-like fibers of the invention, wherein the DTY texturing process used can provide appropriate and stable tension for the tow;
(3) The method for preparing black cotton-like fibers of the invention, wherein the prepared black cotton-like fiber has good performance;
(4) The method for preparing black cotton-like fibers of the invention, can reduce the wear of the first yarn guide and avoid the loss of resources.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

In the examples of the invention, the breaking strength, the interlacing degree and the CV value of breaking strength of the black cotton-like fibers produced on the first day refer to the average value of the performances of the black cotton-like fiber obtained on the first full day of production; the breaking strength, the interlacing degree and the CV value of breaking strength of the black cotton-like fibers produced after 60 days of continuous production refer to the average value of the performances of the black cotton-like fiber obtained on the 60th full day of production.

Figure 1:
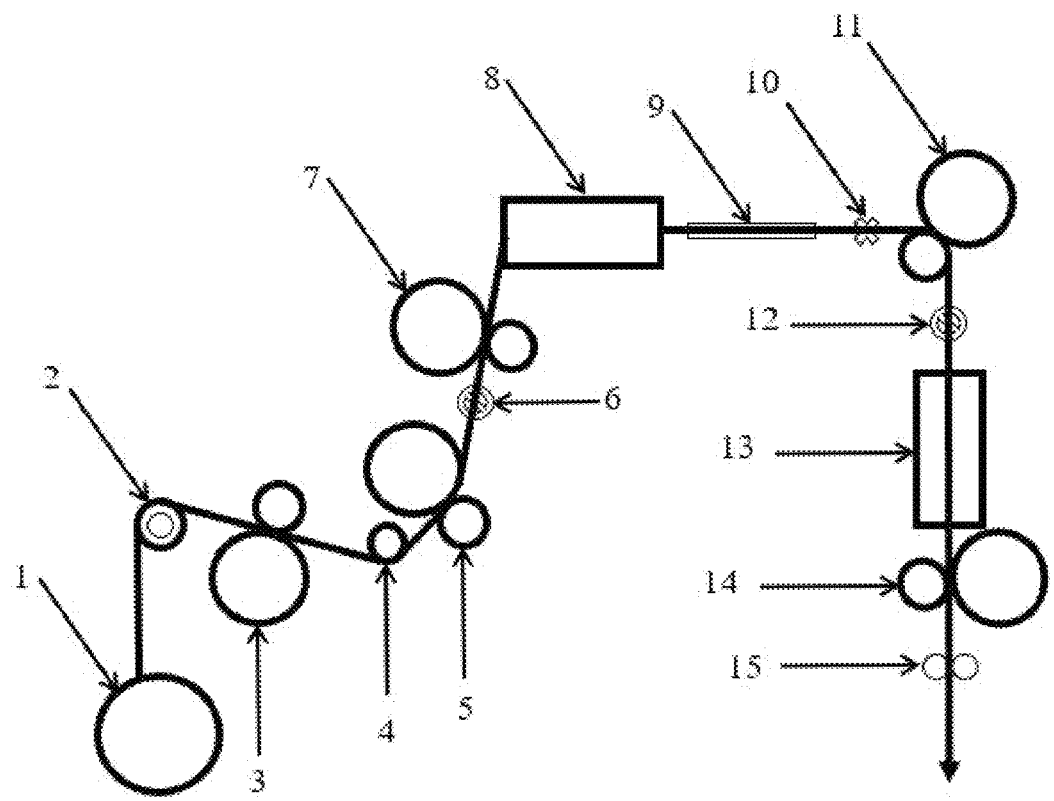
FIG. 1 is a flow chart of the preparation process of the invention.

The process of preparing black cotton-like fibers by using DTY texturing process is as follows: as shown in FIG. 1, polyester POY fibers and polyester FDY fibers 1 containing carbon black with an average particle size of 0.3-0.4 μm are sequentially passed through a first yarn guide 2, a yarn guide roller 3, a tensioner 4, a first yarn feeding roller 5, pre-entangling 6, a second yarn feeding roller 7, a first deformation hot box 8, a cooling plate 9, a false twister 10, a third yarn feeding roller 11, a middle entangling device 12, a setting hot box 13, a setting yarn feeding roller 14, oiling 15, and winding to obtain black cotton-like fibers.

Example 1

Figure 2:
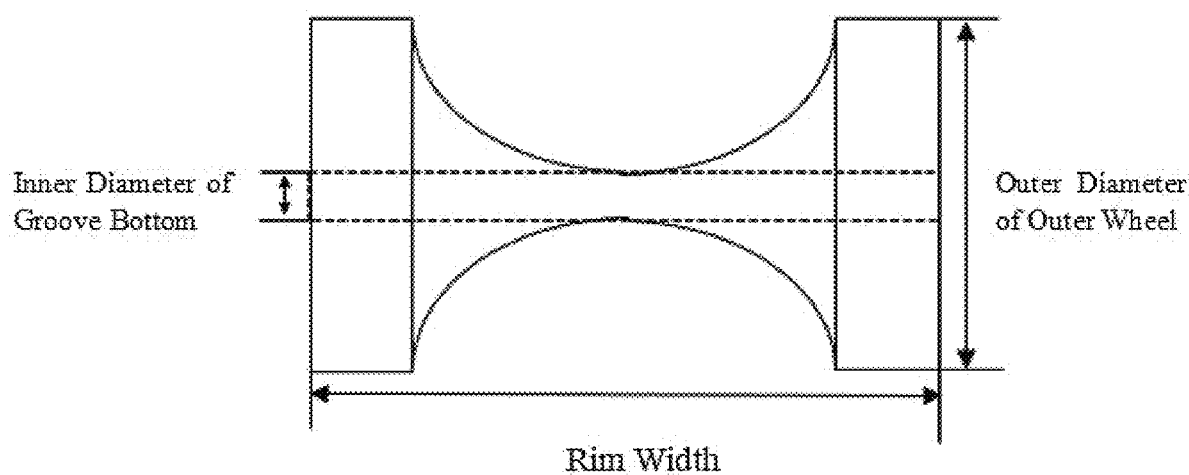
FIG. 2 is a schematic diagram of sectional structure of the yarn guide wheel of the invention; wherein the numbers in the figures are respectively represented: 1—polyester POY fibers and polyester FDY fibers, 2—first yarn guide, 3—yarn guide roller, 4—tensioner, 5—first yarn feeding roller, 6—pre-entangling, 7—second yarn feeding roller, 8—first deformation hot box, 9—cooling plate, 10—false twister, 11—third yarn feeding roller, 12—middle entangling device, 13—setting hot box, 14—setting yarn feeding roller, and 15—oiling.

A method for preparing black cotton-like fibers, using the said DTY texturing process, wherein specifications of the polyester POY fiber and the polyester FDY fiber are both 120 dtex/96f, and contents of carbon black in the polyester POY fiber and the polyester FDY fiber are both 1.2 wt %; wherein the first yarn guide is a yarn guide wheel, the tow contacts the groove bottom of the first yarn guide in the process of movement, driving the first yarn guide to rotate; wherein the material of the yarn guide wheel is ceramic, the surface hardness of groove bottom is 1500 HV, and the friction coefficient between groove bottom and the tow is 0.2; as shown in FIG. 2, wherein the rim width of the yarn guide wheel is 20 mm, the outer diameter of the outer wheel of the yarn guide wheel is 9.4 mm, and the inner diameter of groove bottom is 6 mm; wherein the tensioner is a magnetic tensioner; wherein the tow contacts groove bottom of the yarn guide wheel carried by the tensioner in the process of movement; wherein the setting tension value of the tensioner is 10 cN;
wherein process parameters are: a pre-entangling jet air pressure of 2.5 bar, a pre-entangling jet aperture of 1.5 mm, a first deformation hot box temperature of 175° C., a setting hot box temperature of 160° C., a linear velocity ratio of the first yarn feeding roller to the second yarn feeding roller of 1.03, a linear velocity ratio of the third yarn feeding roller to the second yarn feeding roller of 1.1, a setting overfeeding rate of 4%, a winding speed of 500 m/min, and a winding overfeeding rate of 2%.
Adopting the above process for continuous production, the tension of the tow during pre-entangling is 3.7 cN; wherein the black cotton-like fiber produced on the first day has a breaking strength of 2.3 cN/dtex, an interlacing degree of 90/m, and a CV value of breaking strength of 5.15%;
wherein the black cotton-like fiber produced after 60 days of continuous production has a breaking strength of 2.2 cN/dtex, an interlacing degree of 85/m, and a CV value of breaking strength of 5.65%.

Comparison 1

A method for preparing black cotton-like fibers, basically the same as Example 1, except for that: both the first yarn guide and the tensioner are replaced by yarn guide rollers that cannot be rolled, and do not go through the process of yarn guide rollers. The black cotton-like fiber produced on the first day has a breaking strength of 2.1 cN/dtex, an interlacing degree of 93/m, and a CV value of breaking strength of 6.2%; the black cotton-like fiber produced after 10 days of continuous production has a breaking strength of 1.8 cN/dtex, an interlacing degree of 74/m, and a CV value of breaking strength of 7.6%. After 60 days, it can no longer be produced. Comparing Example 1 with Comparison 1, it can be seen that the breaking strength, the interlacing degree, and the CV value of breaking strength of the black cotton-like fiber have changed significantly, because the wear of the first yarn guide has a greater impact on the quality of fibers.

Example 2

A method for preparing black cotton-like fibers, using the said DTY texturing process, wherein specifications of the polyester POY fiber and the polyester FDY fiber are both 120 dtex/96f, and contents of carbon black in the polyester POY fiber and the polyester FDY fiber are both 1.3 wt %; wherein the first yarn guide is a yarn guide wheel, the tow contacts the groove bottom of the first yarn guide in the process of movement, driving the first yarn guide to rotate; wherein the material of the yarn guide wheel is ceramic, the surface hardness of groove bottom is 1800 HV, and the friction coefficient between groove bottom and the tow is 0.2; wherein the rim width of the yarn guide wheel is 20 mm, the outer diameter of the outer wheel of the yarn guide wheel is 9.4 mm, and the inner diameter of groove bottom is 6.2 mm; wherein the tensioner is a magnetic tensioner; wherein the tow contacts groove bottom of the yarn guide wheel carried by the tensioner in the process of movement; wherein the setting tension value of the tensioner is 9.2 cN;

wherein process parameters are: a pre-entangling jet air pressure of 2.6 bar, a pre-entangling jet aperture of 1.5 mm, a first deformation hot box temperature of 178° C., a setting hot box temperature of 152° C., a linear velocity ratio of the first yarn feeding roller to the second yarn feeding roller of 1.03, a linear velocity ratio of the third yarn feeding roller to the second yarn feeding roller of 1.12, a setting overfeeding rate of 4.2%, a winding speed of 520 m/min, and a winding overfeeding rate of 2.2%.

Adopting the above process for continuous production, the tension of the tow during pre-entangling is 2.5 cN; wherein the black cotton-like fiber produced on the first day has a breaking strength of 2.2 cN/dtex, an interlacing degree of 97/m, and a CV value of breaking strength of 5.05%;

wherein the black cotton-like fiber produced after 60 days of continuous production has a breaking strength of 2.1 cN/dtex, an interlacing degree of 89/m, and a CV value of breaking strength of 5.46%.

Example 3

A method for preparing black cotton-like fibers, using the said DTY texturing process, wherein specifications of the polyester POY fiber and the polyester FDY fiber are both 120 dtex/96f, and contents of carbon black in the polyester POY fiber and the polyester FDY fiber are both 1.4 wt %; wherein the first yarn guide is a yarn guide wheel, the tow contacts the groove bottom of the first yarn guide in the process of movement, driving the first yarn guide to rotate; wherein the material of the yarn guide wheel is ceramic, the surface hardness of groove bottom is 1880 HV, and the friction coefficient between groove bottom and the tow is 0.22; wherein the rim width of the yarn guide wheel is 23 mm, the outer diameter of the outer wheel of the yarn guide wheel is 10.2 mm, and the inner diameter of groove bottom is 7 mm; wherein the tensioner is a magnetic tensioner; wherein the tow contacts groove bottom of the yarn guide wheel carried by the tensioner in the process of movement; wherein the setting tension value of the tensioner is 8.7 cN;

wherein process parameters are: a pre-entangling jet air pressure of 2.8 bar, a pre-entangling jet aperture of 1.6 mm, a first deformation hot box temperature of 184° C., a setting hot box temperature of 155° C., a linear velocity ratio of the first yarn feeding roller to the second yarn feeding roller of 1.04, a linear velocity ratio of the third yarn feeding roller to the second yarn feeding roller of 1.13, a setting overfeeding rate of 4.5%, a winding speed of 565 m/min, and a winding overfeeding rate of 2.7%.

Adopting the above process for continuous production, the tension of the tow during pre-entangling is 4.5 cN; wherein the black cotton-like fiber produced on the first day has a breaking strength of 2.3 cN/dtex, an interlacing degree of 100/m, and a CV value of breaking strength of 5.32%;

wherein the black cotton-like fiber produced after 60 days of continuous production has a breaking strength of 2.2 cN/dtex, an interlacing degree of 92/m, and a CV value of breaking strength of 5.86%.

Example 4

A method for preparing black cotton-like fibers, using the said DTY texturing process, wherein specifications of the polyester POY fiber and the polyester FDY fiber are both 120 dtex/96f, and contents of carbon black in the polyester POY fiber and the polyester FDY fiber are both 1.5 wt %; wherein the first yarn guide is a yarn guide wheel, the tow contacts the groove bottom of the first yarn guide in the process of movement, driving the first yarn guide to rotate; wherein the material of the yarn guide wheel is ceramic, the surface hardness of groove bottom is 2000 HV, and the friction coefficient between groove bottom and the tow is 0.22; wherein the rim width of the yarn guide wheel is 25 mm, the outer diameter of the outer wheel of the yarn guide wheel is 10.7 mm, and the inner diameter of groove bottom is 7.4 mm; wherein the tensioner is a magnetic tensioner; wherein the tow contacts groove bottom of the yarn guide wheel carried by the tensioner in the process of movement; wherein the setting tension value of the tensioner is 7 cN;

wherein process parameters are: a pre-entangling jet air pressure of 2.9 bar, a pre-entangling jet aperture of 1.7 mm, a first deformation hot box temperature of 190° C., a setting hot box temperature of 160° C., a linear velocity ratio of the first yarn feeding roller to the second yarn feeding roller of 1.04, a linear velocity ratio of the third yarn feeding roller to the second yarn feeding roller of 1.14, a setting overfeeding rate of 5%, a winding speed of 600 m/min, and a winding overfeeding rate of 3%.

Adopting the above process for continuous production, the tension of the tow during pre-entangling is 5.0 cN; wherein the black cotton-like fiber produced on the first day has a breaking strength of 2.2 cN/dtex, an interlacing degree of 93/m, and a CV value of breaking strength of 5.25%;

wherein the black cotton-like fiber produced after 60 days of continuous production has a breaking strength of 2.1 cN/dtex, an interlacing degree of 87/m, and a CV value of breaking strength of 5.86%.

What is claimed is:

1. A method for preparing black fiber, using a drawn textured yarn (DTY) texturing process, wherein a polyester pre-oriented yarn (POY) fiber and a polyester fully drawn yarn (FDY) fiber are sequentially passed through a first yarn guide, a yarn guide roller, a tensioner, a first yarn feeding roller, pre-entangling, a second yarn feeding roller, a first deformation hot box, a cooling plate, a false twister, a third yarn feeding roller, a middle entangling device, a setting hot box, a setting yarn feeding roller, oiling, and winding to obtain the black fiber;

wherein the polyester POY fiber and the polyester FDY fiber both contain carbon black;

wherein the first yarn guide is a yarn guide wheel, a rim width of the yarn guide wheel is 20-25 mm, an outer diameter of an outer wheel of the yarn guide wheel is 9.4-10.7 mm, and an inner diameter of the groove bottom is 6-7.4 mm;

wherein a material of the first yarn guide is ceramic, a surface hardness of the groove bottom of the first yarn guide is 1500-2000 HV;

wherein a tow contacts a groove bottom of the first yarn guide in a process of movement, driving the first yarn guide to rotate;

wherein the tensioner is a magnetic tensioner; wherein the tow contacts a groove bottom of a yarn guide wheel carried by the tensioner in the process of movement; wherein a setting tension value of the tensioner is 7-10 cN;

wherein a linear velocity ratio of the first yarn feeding roller to the second yarn feeding roller is 1.03-1.04.

2. The method according to claim 1, wherein a tension value of the tow during pre-entangling is 2.5-5.0 cN.

3. The method according to claim 1, wherein contents of the carbon black in the polyester POY fiber and the polyester FDY fiber are both 1.2-1.5 wt %.

4. The method according to claim 3, wherein an average particle size of the carbon black is 0.3-0.4 μm.

5. The method according to claim 1, wherein specifications of the polyester POY fiber and the polyester FDY fiber are both 120 dtex/96f, and a linear density of the black fiber is 232 dtex.

6. The method according to claim 1, wherein main process parameters are: a pre-entangling jet air pressure of 2.5-2.9 bar, a pre-entangling jet aperture of 1.5-1.7 mm, a first deformation hot box temperature of 175-190° C., a setting hot box temperature of 150-160° C., a linear velocity ratio of the third yarn feeding roller to the second yarn feeding roller of 1.1-1.14, a setting overfeeding rate of 4.0-5.0%, a winding speed of 500-600 m/min, and a winding overfeeding rate of 2.0-3.0%.

7. The method according to claim 1, wherein the black fiber has a breaking strength of 2.1-2.3 cN/dtex, an interlacing degree of 90-100/m, and a coefficient of variation (CV) value of breaking strength ≤6.00%;

wherein change rates of the breaking strength, the interlacing degree and the CV value of breaking strength of the black fiber produced by a continuous production for 60 days are less than or equal to 10%.

* * * * *